United States Patent
Ly et al.

(10) Patent No.: US 12,376,050 B2
(45) Date of Patent: Jul. 29, 2025

(54) DL POWER ALLOCATION IN INTER-BAND CA INCLUDING CARRIERS WITHOUT SSB

(71) Applicant: QUALCOMM Incorporated, San Diego, CA (US)

(72) Inventors: Hung Dinh Ly, San Diego, CA (US); Heechoon Lee, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 17/805,441

(22) Filed: Jun. 3, 2022

(65) Prior Publication Data
US 2023/0397133 A1    Dec. 7, 2023

(51) Int. Cl.
| H04W 4/00 | (2018.01) |
| H04L 5/00 | (2006.01) |
| H04W 24/10 | (2009.01) |
| H04W 52/36 | (2009.01) |
| H04W 56/00 | (2009.01) |

(52) U.S. Cl.
CPC ......... *H04W 56/001* (2013.01); *H04L 5/0051* (2013.01); *H04W 24/10* (2013.01); *H04W 52/36* (2013.01)

(58) Field of Classification Search
CPC ... H04W 56/001; H04W 24/10; H04W 52/36; H04L 5/0051
See application file for complete search history.

(56) References Cited

U.S. PATENT DOCUMENTS

| 12,238,783 | B2* | 2/2025 | Narasimha | H04W 72/0446 |
| 2014/0321345 | A1* | 10/2014 | Li | H04W 52/143 370/311 |
| 2017/0134130 | A1* | 5/2017 | Li | H04L 5/0057 |
| 2019/0260447 | A1* | 8/2019 | Nam | H04W 72/0453 |
| 2019/0273544 | A1* | 9/2019 | Cha | H04L 5/0091 |
| 2019/0306850 | A1* | 10/2019 | Zhang | H04B 7/0465 |
| 2019/0380054 | A1* | 12/2019 | Manolakos | H04L 5/0044 |
| 2020/0187159 | A1* | 6/2020 | Ko | H04L 5/0051 |
| 2020/0245272 | A1* | 7/2020 | Hong | H04W 56/001 |
| 2020/0351950 | A1* | 11/2020 | Liu | H04W 74/0833 |
| 2021/0136532 | A1* | 5/2021 | Liu | H04W 4/06 |
| 2022/0030476 | A1* | 1/2022 | Park | H04W 36/00692 |
| 2022/0104147 | A1* | 3/2022 | Cui | H04W 52/243 |
| 2022/0116169 | A1* | 4/2022 | Stare | H04L 5/0048 |

(Continued)

*Primary Examiner* — Bob A Phunkulh
(74) *Attorney, Agent, or Firm* — Paul M. McAdams; Polsinelli LLP

(57) ABSTRACT

Apparatus, methods, and computer program products for DL power allocation in inter-band CA with carriers with no SSB transmissions are provided. An example method may include receiving, from a second network node, SSB transmit power information for at least one carrier of a set of carriers, where the set of carriers may be associated with inter-band carrier aggregation, and where the SSB transmit power information may be indicative of an SSB transmit power or an SSB transmit power offset. The example method may further include determining a set of CSI-RS EPREs based on the SSB transmit power information for the at least one carrier, where the set of CSI-RS EPREs corresponds to a CSI-RS transmission in a first carrier of the set of carriers, where the first carrier is configured without SSB transmission.

30 Claims, 14 Drawing Sheets

(56) References Cited

U.S. PATENT DOCUMENTS

2022/0131667 A1* 4/2022 Taherzadeh Boroujeni ................ H04L 5/0094
2024/0306100 A1* 9/2024 Noh ...................... H04W 52/42

* cited by examiner

DL POWER ALLOCATION IN INTER-BAND CA INCLUDING CARRIERS WITHOUT SSB

TECHNICAL FIELD

The present disclosure relates generally to communication systems, and more particularly, to wireless communication systems with inter-band carrier aggregation (CA).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first network node (such as a user equipment (UE)) are provided. The apparatus may include a memory and at least one processor coupled to the memory. The memory and the at least one processor coupled to the memory may be configured to receive, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. The memory and the at least one processor coupled to the memory may be further configured to determine a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. The memory and the at least one processor coupled to the memory may be further configured to perform one or more processes based on the CSI-RS transmission associated with the set of CSI-RS EPREs in the first carrier, where the one or more processes include time or frequency tracking based on the CSI-RS transmission or generation of measurement information based on the CSI-RS transmission.

In another aspect of the disclosure, a method, a computer-readable medium, and an apparatus at a first network node (such as a network entity) are provided. The apparatus may include a memory and at least one processor coupled to the memory. The memory and the at least one processor coupled to the memory may be configured to transmit, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. The memory and the at least one processor coupled to the memory may be further configured to receive a report of a measurement from the second network node based on a set of CSI-RS EPREs based on the SSB transmit power information for the at least one carrier, where the set of CSI-RS EPREs corresponds to a CSI-RS transmission in a carrier without SSB transmission of the set of carriers.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
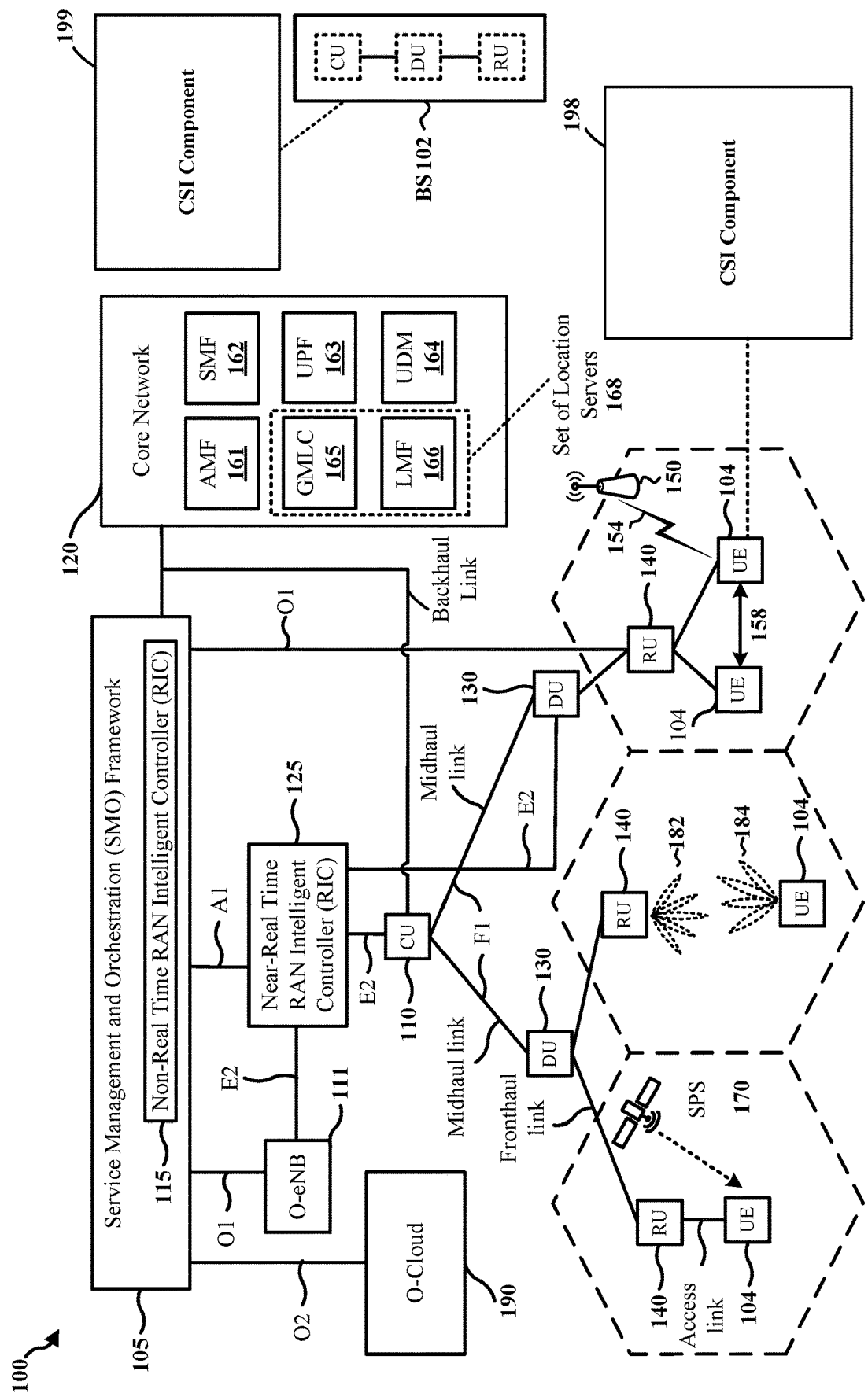
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a CSI component 198. In some aspects, the CSI component 198 may be configured to receive, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. In some aspects, the CSI component 198 may be further configured to determine a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. In some aspects, the CSI component 198 may be further configured to perform one or more processes based on the CSI-RS transmission associated with the set of CSI-RS EPREs in the first carrier, where the one or more processes include time or frequency tracking based on the CSI-RS transmission or generation of measurement information based on the CSI-RS transmission.

In certain aspects, the base station 102 may include a CSI component 199. In some aspects, the CSI component 199 may be configured to transmit, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. In some aspects, the CSI component 199 may be further configured to receive a report of a measurement from the second network node based on a set of CSI-RS EPREs based on the SSB transmit power information for the at least one carrier, where the set of CSI-RS EPREs corresponds to a CSI-RS transmission in a carrier without SSB transmission of the set of carriers. Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node)

may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
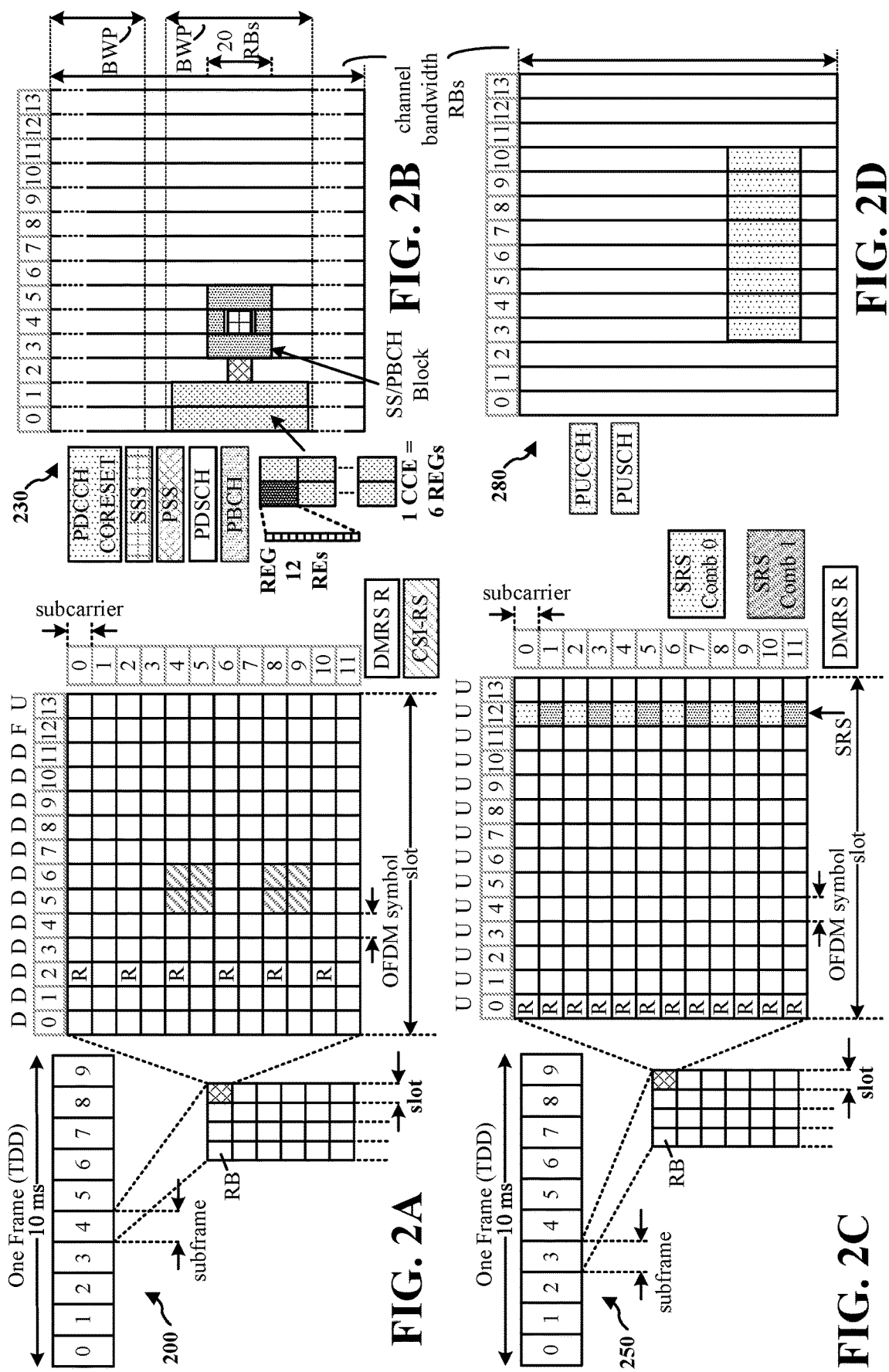
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
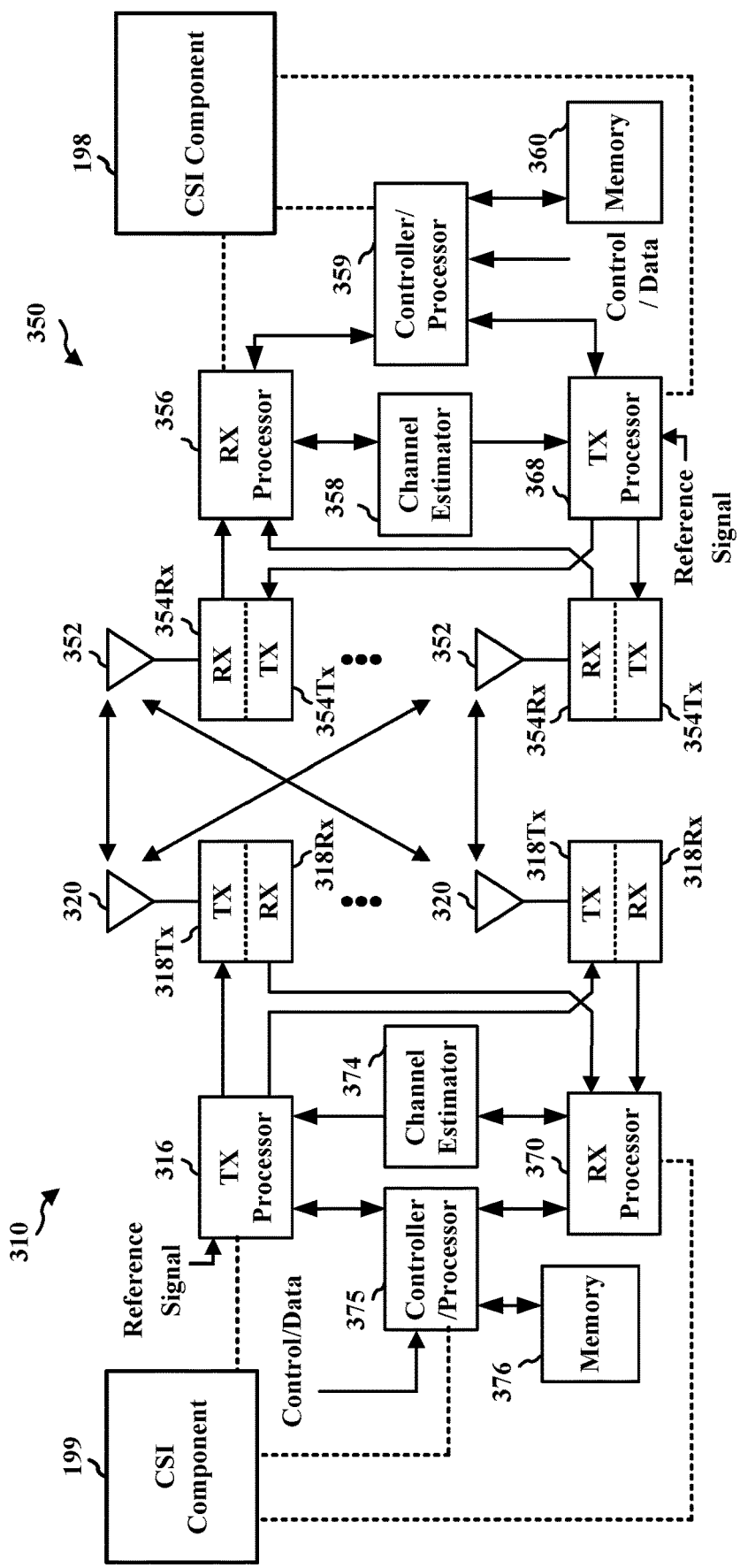
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with CSI component 198 of FIG. 1.

At least one of the TX processor 316, the RX processor 370, and the controller/processor 375 may be configured to perform aspects in connection with CSI component 199 of FIG. 1.

Carrier aggregation (CA) is a mechanism that aggregates multiple component carriers (CCs), which can be jointly used for transmission to/from a single device. Two or more carriers may be combined into one data channel to enhance the data capacity of a network. Carrier aggregation may enable increased UL and DL data rates. Carrier aggregation may include intra-band aggregation with frequency-contiguous component carriers, intra-band aggregation with non-contiguous component carriers, or inter-band aggregation.

Figure 4:
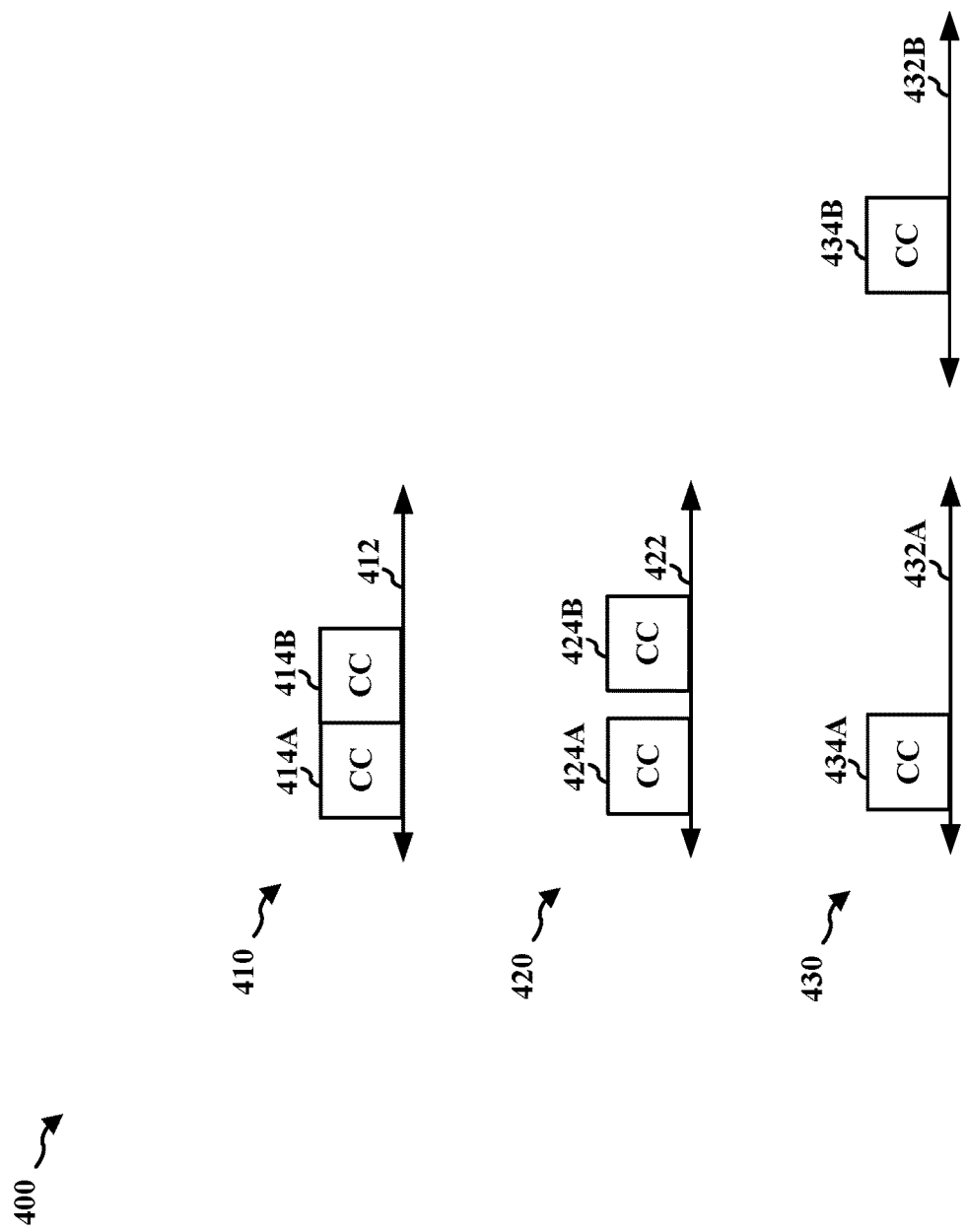
FIG. 4 is a diagram illustrating various types of carrier aggregation.

FIG. 4 is a diagram 400 illustrating various types of carrier aggregation. As illustrated in example 410 of FIG. 4, for intra-band aggregation with frequency-contiguous component carriers, in a frequency band 412, two frequency-contiguous component carriers 414A and 414B may be aggregated. As illustrated in example 420 of FIG. 4, for intra-band aggregation with non-contiguous component carriers, in a frequency band 422, two non-contiguous component carriers 424A and 424B may be aggregated. As illustrated in example 430 of FIG. 4, for inter-band aggregation, a component carrier 434A on a first frequency band 432A may be aggregated with a component carrier 434B on a second frequency band 432B.

Inter-band carrier aggregation may be utilized with component carriers with SSB transmissions and component carriers without SSB transmissions. In some aspects, among a group of component carriers to be aggregated, a component carrier with an SSB transmission may be referred to as an "anchor carrier" and a component carrier without an SSB transmission may be referred to as an "SSB-less carrier." In some wireless communication systems, SSB or system information (SI) in one carrier (e.g., the carrier with the SSB transmission) may provide time or frequency (T/F) synchronization information and SI for other carriers (e.g., the carriers without SSB transmissions). Such a configuration may improve secondary cell (SCell) activation latency by facilitating efficient SCell activation/deactivation according to the traffic for network power savings. Such a configuration may also improve resource utilization by downlink overhead reduction. In addition, such a configuration may enable various network energy savings.

In some wireless communication systems, downlink power allocation may be based on a serving cell configuration. The serving cell configuration may include a synchronization signal (SS) PBCH transmit power (such as by including an information element (IE)), which may be represented by an IE ss-PBCH-BlockPower. Based on the SS PBCH transmit power, a UE may derive a secondary synchronization signal (SSS) EPRE of a SS/PBCH block. The transmit power for CSI-RS, such as CSI-RS EPRE may be derived from (e.g., computed based on) the SS PBCH transmit power and a CSI-RS power offset (e.g., represented by an IE powerControlOffsetSS). The transmit power for a PDSCH, such as PDSCH EPRE, may be derived from (e.g., computed based on) the CSI-RS EPRE and a power offset (e.g., represented by IE powerControlOffset) between the PDSCH EPRE and the CSI-RS EPRE. The power offset between the PDSCH EPRE and the CSI-RS EPRE and the CSI-RS power offset may be associated with an IE associated with the CSI resource set (e.g., represented by IE NZP-CSI-RS-Resource). In some aspects, the CSI-RS EPRE and a power offset (e.g., represented by IE powerControlOffset) and the CSI-RS power offset (e.g., represented by an IE powerControlOffsetSS) may be configured for each carrier.

For carriers in inter-band CA, the SSB transmit power (which may be indicated by the IE ss-PBCH-BlockPower) may be indicated to the UE, which may be used as a reference transmit power for the UE to derive (e.g., compute) CSI-RS transmit power for CSI-RS transmission in the carrier. In addition, the CSI-RS transmit power may be used to (e.g., compute) PDSCH transmit power for a PDSCH transmission in the carrier. CSI-RS may be used for various purposes such as a time-frequency tracking function based on a tracking reference signal (TRS), a CSI measurement (such as a radio signal received power (RSRP) measurement, a radio signal received quality (RSRQ) measurement, a received signal strength indicator (RSSI) measurement, a signal-to-interference plus noise ratio (SINR) measurement, or the like), a beam management measurement, or the like. However, for a carrier without an SSB transmission, there may be no associated SSB transmit power and no reference transmit power for the UE to derive (e.g., compute) CSI-RS transmit power for a CSI-RS transmission in the carrier. Aspects provided herein may enable using the SSB transmit power of a carrier with an SSB transmission (e.g., an anchor carrier) as a reference transmit power for a UE to derive (e.g., compute) the CSI-RS transmit power for a CSI-RS transmission in a carrier without an SSB transmission (e.g., an SSB-less carrier). In a carrier without an SSB transmission (e.g., an SSB-less carrier), channels other than broadcast channels (e.g., SSB, SI PDCCH/PDSCH, paging PDCCH/PDSCH) may be transmitted. Knowing the transmit power of these channels by using a reference transmit power to derive (e.g., compute) the transmit power may improve UE performance and overall communication quality.

Figure 5:
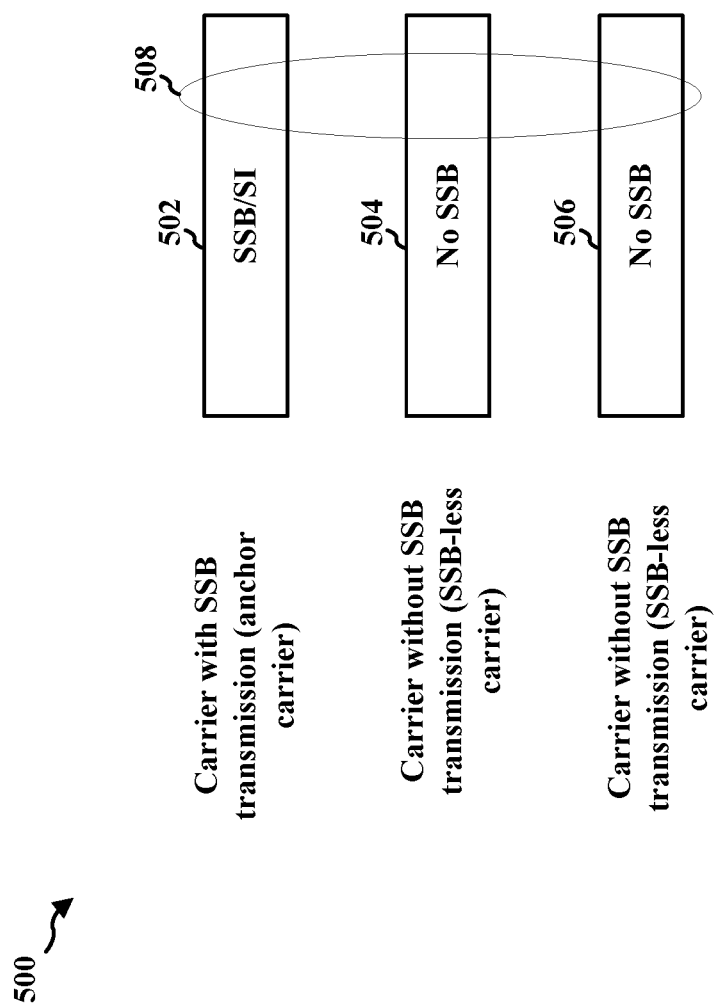
FIG. 5 is a diagram illustrating an example with carriers without SSB transmission and carrier with SSB transmission.

FIG. 5 is a diagram 500 illustrating an example including carriers without an SSB transmission and a carrier with an SSB transmission. As illustrated in FIG. 5, a carrier with an SSB transmission (e.g., an anchor carrier) 502 may be associated with an SSB and SI. A first carrier without an SSB transmission (e.g., an SSB-less carrier) 504 and a second carrier without an SSB transmission (e.g., an SSB-less carrier) 506 may be associated with the carrier with the SSB transmission (e.g., an anchor carrier) 502. In some aspects, the carrier with the SSB transmission (e.g., an anchor carrier) 502, the first carrier without a SSB transmission (e.g., an SSB-less carrier) 504, and the second carrier without a SSB transmission (e.g., an SSB-less carrier) 506 may be associated with a same virtual cell 508. As described herein, in some aspects, the carrier with the SSB transmission (e.g., an anchor carrier) 502 may provide T/F synchronization and SI for the first carrier without an SSB transmission (e.g., an SSB-less carrier) 504 and the second carrier without an SSB transmission (e.g., an SSB-less carrier) 506.

Figure 6:
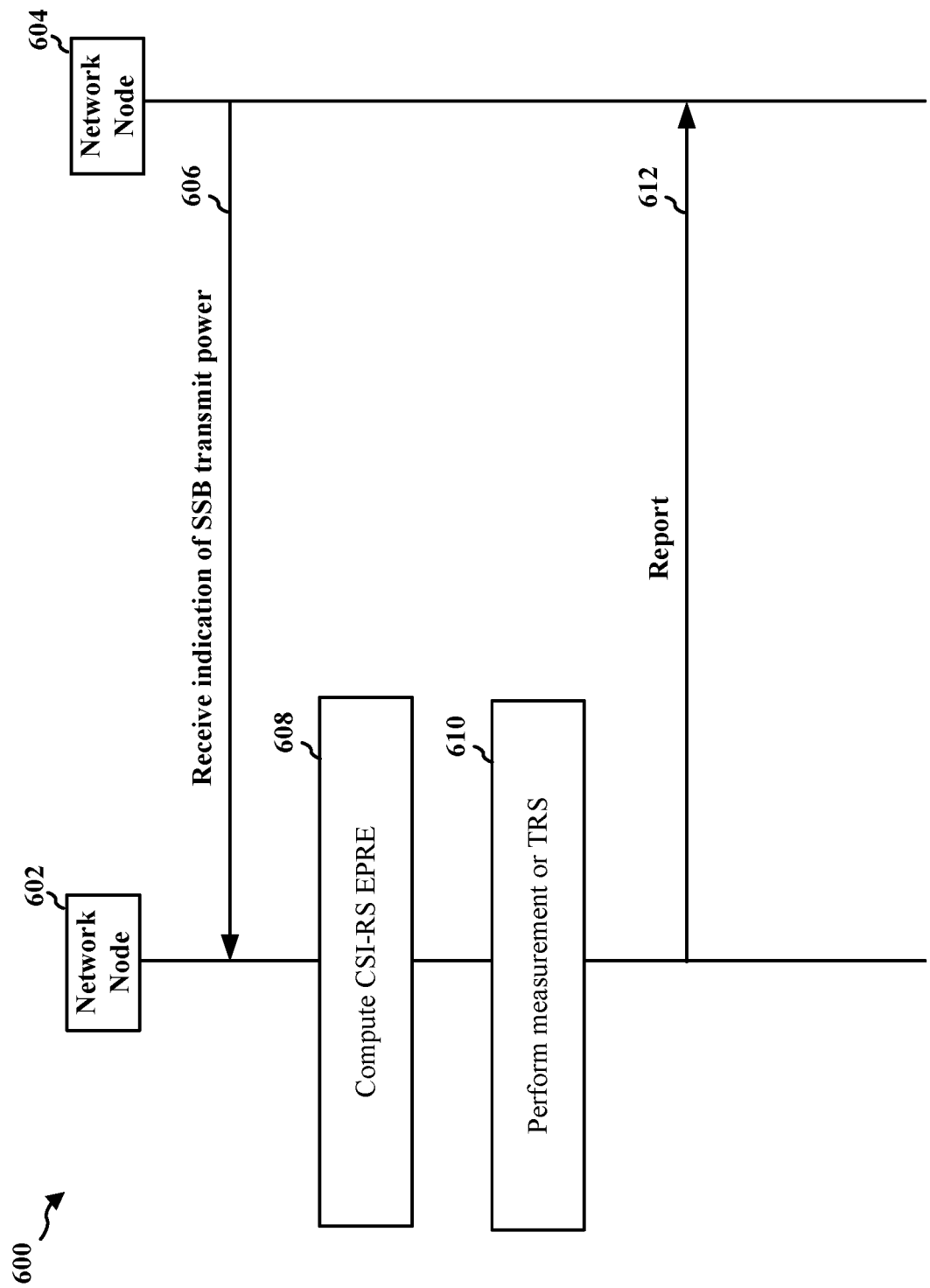
FIG. 6 is a diagram illustrating example communications between two network nodes.

FIG. 6 is a diagram 600 illustrating example communications between network node 602 and network node 604. In some aspects, the network node 602 may be a UE. In some aspects, the network node 604 may be implemented as an aggregated base station, a disaggregated base station, an integrated access and backhaul (IAB) node, a relay node, a sidelink node, or the like. In some aspects, the network node 604 may be a network entity that may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. The first network node 602 and the second network node 604 may operate with inter-band carrier aggregation including a carrier with an SSB transmission (e.g., anchor carrier) and one or more carriers without an SSB transmission (e.g., SSB-less carrier).

As illustrated in FIG. 6, the network node 602 may receive an indication of an SSB transmit power 606 from the network node 604. The indication of the SSB transmit power 606 may indicate an SSB transmit power associated with a carrier with an SSB transmission (e.g., anchor carrier). In some aspects, the SSB transmit power associated with the carrier with the SSB transmission (e.g., anchor carrier) may be represented by an IE (e.g., ss-PBCH-BlockPower).

In some aspects, at 608, the network node 602 may compute a CSI-RS EPRE for one or more carriers without an SSB transmission (e.g., SSB-less carrier). In some aspects, the network node 602 may use the SSB transmit power associated with the carrier with the SSB transmission (e.g., anchor carrier) that may be represented by the IE ss-PBCH-BlockPower to derive (e.g., compute) transmit power (such as the set of CSI-RS EPREs) for a CSI-RS transmission in one or more carriers without an SSB transmission (e.g., SSB-less carrier). In some aspects, the network node 602 may use the SSB transmit power associated with the carrier with the SSB transmission (e.g., anchor carrier) and an SSB to CSI-RS power offset (e.g., represented by IE powerControlOffsetSS) to derive (e.g., compute) the transmit power (such as the set of CSI-RS EPREs) for a CSI-RS transmission in one or more carriers without an SSB transmission (e.g., SSB-less carrier).

Figure 7:
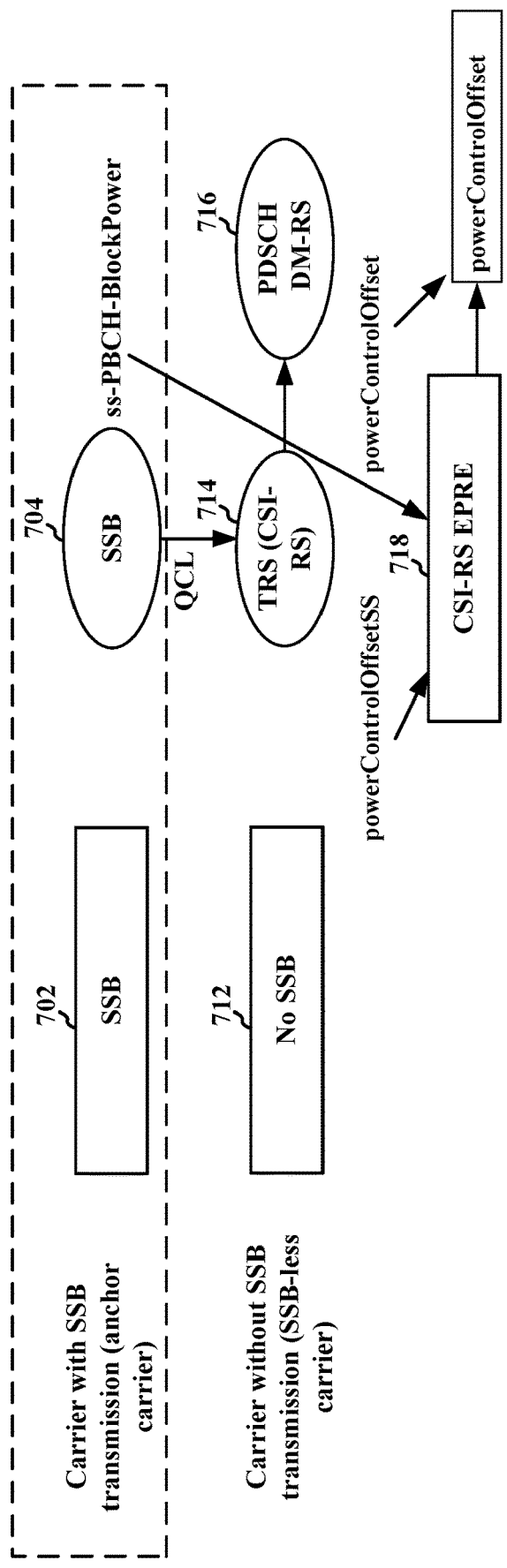
FIG. 7 is a diagram illustrating deriving CSI-RS EPRE for a carrier without SSB transmission.

For example, FIG. 7 is a diagram 700 illustrating deriving CSI-RS EPRE for a carrier without SSB transmission. Referring to FIG. 7, a carrier with an SSB transmission (e.g., anchor carrier) 702 may be associated with an SSB 704. The transmit power of the SSB 704 may be indicated by the indication of the SSB transmit power 606 and may be represented by an IE ss-PBCH-BlockPower. A carrier without an SSB transmission (e.g., SSB-less carrier) 712 may be associated with a CSI-RS (which may be used as a TRS) 714. The CSI-RS 714 may be associated with PDSCH DM-RS 716.

In some aspects, the CSI-RS 714 may be quasi-co-located (QCLed) with the SSB 714 with respect to one or more of (depending on QCL type): a Doppler shift, a Doppler spread, an average delay, a delay spread, a set of spatial Rx parameters, or the like. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam). In some aspects, the first network node 602 may derive (e.g., compute) a transmit power (e.g., CSI-RS EPRE) 718 associated with the CSI-RS 714 associated with the carrier without an SSB transmission (e.g., SSB-less carrier) 712 based on the SSB transmit power associated with the SSB 704 (which may be represented by an IE ss-PBCH-BlockPower) and SSB to CSI-RS power offset (which may be represented by powerControlOffsetSS). In addition, PDSCH EPRE associated with the PDSCH DM-RS 716 may be derived based on the transmit power (e.g., CSI-RS EPRE) 718 associated with the CSI-RS 714 and a power offset (e.g., represented by IE powerControlOffset) between a PDSCH EPRE associated with the PDSCH DM-RS 716 and the transmit power (e.g., CSI-RS EPRE) 718 associated with the CSI-RS 714.

In some aspects, the network node 604 may configure one or more virtual SSB powers in the indication of the SSB transmit power 606. In some aspects, the indication of the SSB transmit power 606 may indicate a virtual SSB transmit power for each carrier without an SSB transmission (e.g., each SSB-less carrier) in the one or more carriers without an SSB transmission (e.g., SSB-less carrier) or for a group of carriers without an SSB transmission in the one or more carriers without an SSB transmission (e.g., SSB-less carrier). In some aspects, each virtual SSB transmit power may be associated with one carrier without an SSB transmission (e.g., one SSB-less carrier). In some aspects, each virtual SSB transmit power may be associated with a group of carriers without an SSB transmission (e.g., SSB-less carriers). In some aspects, if a virtual SSB transmit power is not configured for a carrier without an SSB transmission, the carrier without an SSB transmission may be assumed by the network node 602 to be associated with a virtual SSB transmit power equivalent to the SSB transmit power of the carrier with the SSB transmission (e.g., anchor carrier).

In some aspects, the virtual SSB transmit power is not associated with an SSB (e.g., used as a reference for computing CSI-RS transmission without being associated with an SSB transmission). In such aspects, upon receiving the indication of the SSB transmit power 606, the network node 602 may use the respective configured virtual SSB transmit power associated with the carrier without an SSB transmission (e.g., SSB-less carrier) to derive (e.g., compute) transmit power (such as the set of CSI-RS EPREs) for CSI-RS transmissions on that carrier without an SSB transmission. The configured virtual SSB transmit power may be used as a reference transmit power for computing the transmit power (such as the set of CSI-RS EPREs) for CSI-RS transmissions on that carrier without an SSB transmission. In some aspects, the network node 602 may further use an SSB-to-CSI-RS power offset (e.g., represented by IE powerControlOffsetSS) to derive (e.g., compute) the transmit power (such as the set of CSI-RS EPREs) for a CSI-RS transmission on the carrier without an SSB transmission along with the configured virtual SSB transmit power for each carrier without an SSB transmission. By using a virtual SSB transmit power, the transmit power (such as the set of CSI-RS EPREs) for CSI-RS transmissions on carriers without SSB transmission can be outside of a dynamic range of an SSB transmit power represented by a ss-PBCH-BlockPower and a CSI-RS power offset. For example, the transmit power (such as the set of CSI-RS EPREs) for CSI-RS transmissions on carriers without an SSB transmission may be outside the SSB transmit power represented by a ss-PBCH-BlockPower plus or minus a largest/smallest allowed CSI-RS power offset.

Figure 8:
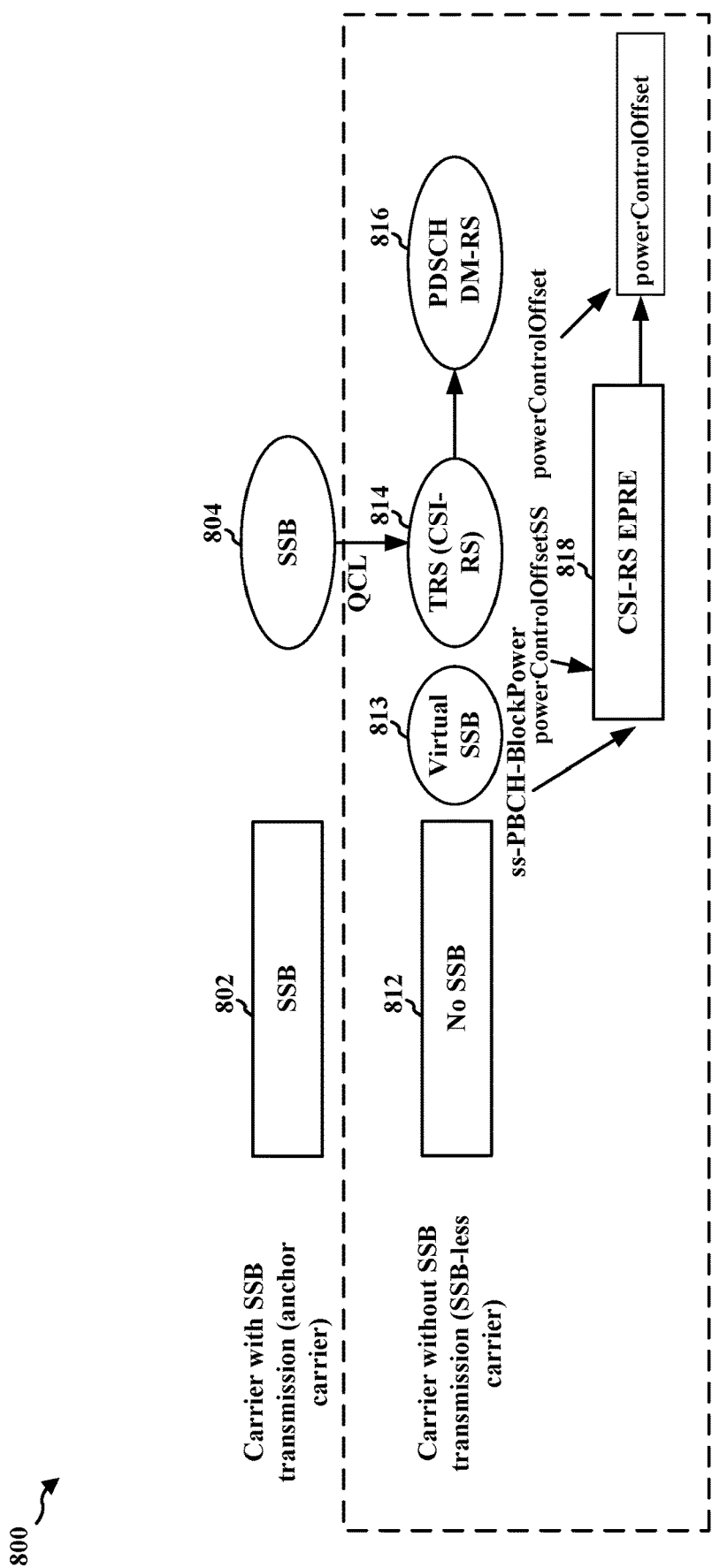
FIG. 8 is a diagram illustrating deriving CSI-RS EPRE for a carrier without SSB transmission.

For example, FIG. 8 is a diagram 800 illustrating deriving CSI-RS EPRE for a carrier without an SSB transmission. Referring to FIG. 8, a carrier with an SSB transmission (e.g., anchor carrier) 802 may be associated with an SSB 804. The transmit power of the SSB 804 may be indicated by the indication of the SSB transmit power 606 and may be represented by an IE (e.g., ss-PBCH-BlockPower). A carrier without an SSB transmission (e.g., SSB-less carrier) 812 may be associated with a virtual SSB 813 (associated with a virtual SSB power but not associated with an actual SSB transmission) and a CSI-RS (which may be used as a TRS) 814. The CSI-RS 814 may be associated with a PDSCH DM-RS 816.

In some aspects, the CSI-RS 814 may be quasi-co-located (QCLed) with the SSB 814 with respect to one or more of (depending on QCL type): a Doppler shift, a Doppler spread, an average delay, a delay spread, a set of spatial Rx parameters, or the like. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam). In some aspects, the first network node 602 may derive (e.g., compute) a transmit power (e.g., CSI-RS EPRE) 818 associated with the CSI-RS 814 associated with the carrier without SSB transmission (e.g., SSB-less carrier) 812 based on the virtual SSB transmit power associated with the virtual SSB 813 (which may be represented by an IE ss-PBCH-BlockPower) and SSB to CSI-RS power offset (which may be represented by powerControlOffsetSS). In addition, PDSCH EPRE associated with the PDSCH DM-RS 816 may be derived based on the transmit power (e.g., CSI-RS EPRE) associated with the CSI-RS 814 and a power offset (e.g., represented by IE powerControlOffset) between PDSCH EPRE associated with the PDSCH DM-RS 816 and the transmit power (e.g., CSI-RS EPRE) 818 associated with the CSI-RS 814.

In some aspects, instead of configuring a virtual SSB power, the network node 604 may configure one or more SSB transmit power offsets relative to the SSB transmit power for an SSB transmission in the carrier with the SSB transmission (e.g., the anchor carrier) for one or more carriers without an SSB transmission (e.g., one or more SSB-less carriers) in the indication of the SSB transmit power 606. In such aspects, the network node 602 may receive the indication of the SSB transmit power 606 which may include one or more SSB transmit power offsets relative to the SSB transmit power for SSB transmission in the carrier with the SSB transmission (e.g., the anchor carrier) for the one or more carriers without an SSB transmission (e.g., one or more SSB-less carriers). In some aspects, each transmit power offset relative to the SSB transmit power for SSB transmission in the carrier with the SSB transmission (e.g., the anchor carrier) may be associated with one carrier without SSB transmission (e.g., one SSB-less carrier). In some aspects, each transmit power offset relative to the SSB transmit power for an SSB transmission in the carrier with the SSB transmission (e.g., the anchor carrier) may be associated with a group of carriers without SSB transmission (e.g., a group of SSB-less carriers). In some aspects, if a transmit power offset relative to the SSB transmit power for an SSB transmission in the carrier with the SSB transmission (e.g., the anchor carrier) is not configured for a carrier without an SSB transmission (e.g., SSB-less carrier), the carrier without an SSB transmission (e.g., SSB-less carrier) may be assumed by the network node 602 to be associated with an offset of zero. In some aspects, based on the transmit power offset relative to the SSB transmit power for SSB transmission in the carrier with the SSB transmission (e.g., the anchor carrier), the network node 602 may derive (e.g., compute) the transmit power (such as the set of CSI-RS EPREs) for a CSI-RS transmission on the carrier without an SSB transmission along with the configured virtual SSB transmit power for each carrier without SSB transmission.

In some aspects, at 610, based on the computed transmit power (such as the set of CSI-RS EPREs) for CSI-RS transmission on the carrier(s) without SSB transmission, the network node 602 may perform measurements or a tracking function at 610. For example, the computed transmit power (such as the set of CSI-RS EPREs) for a CSI-RS transmission on the carrier(s) without SSB transmission may be used for various purposes such as a time-frequency tracking function based on a TRS, CSI measurement, beam management, or the like. In some aspects, the network node 602 may also transmit a measurement report 612 to the network node 604 to facilitate more efficient/effective communication management by the network node 604.

Figure 9:
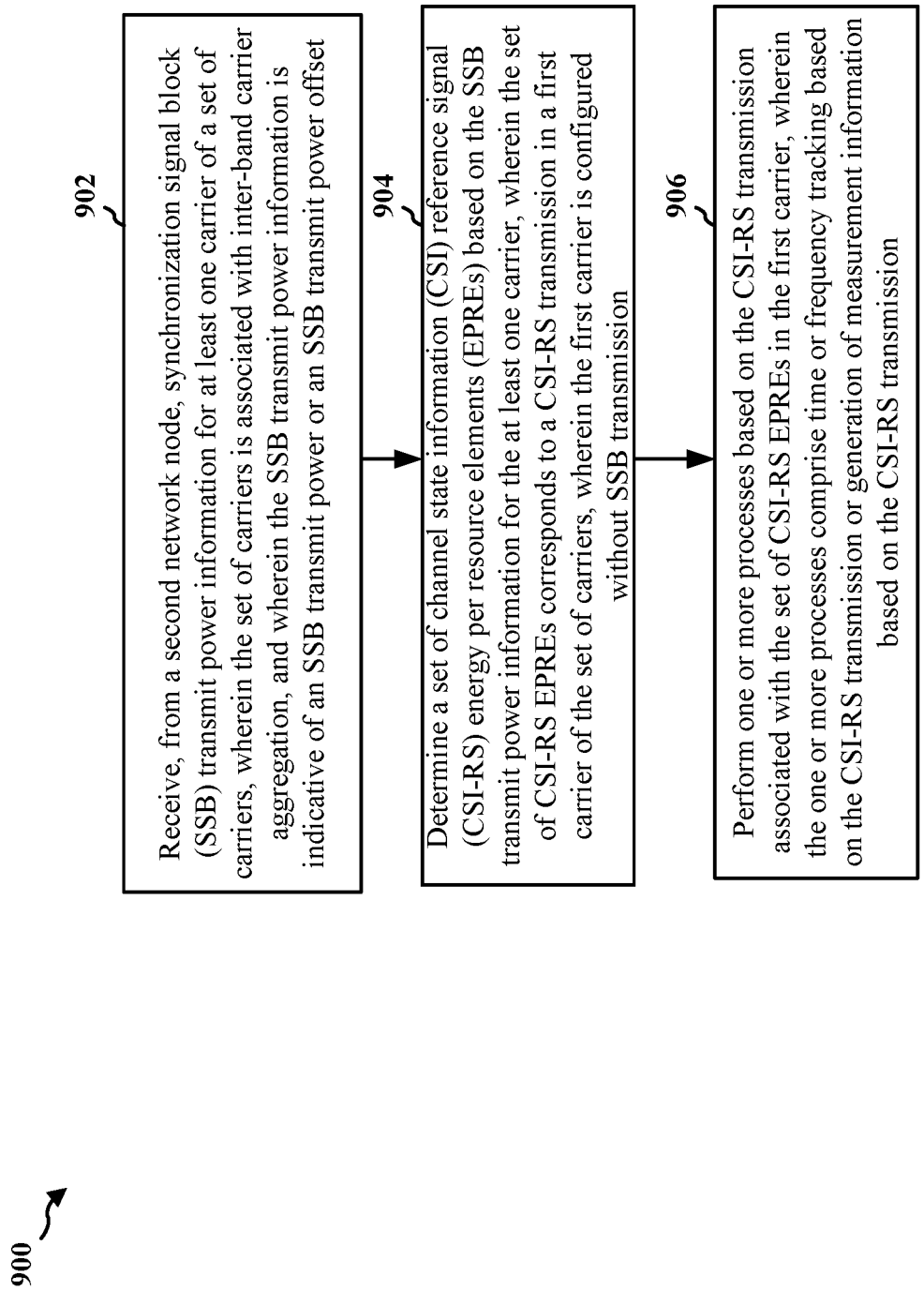
FIG. 9 is a flowchart of a method of wireless communication.

FIG. 9 is a flowchart 900 of a method of wireless communication at a first network node. The first network node may be a UE (e.g., the UE 104, the network node 602, the apparatus 1204).

At 902, the first network node may receive, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. For example, the first network node 602 may receive, from a second network node 604, synchronization signal block (SSB) transmit power information (e.g., 606) for at least one carrier of a set of carriers, where the set of carriers is associated with inter-band carrier aggregation, and where the SSB transmit power information is indicative of an SSB transmit power or an SSB transmit power offset. In some aspects, 902 may be performed by the CSI component 198. The second network node may be a base station or one or more components of a base station.

At 904, the first network node may determine a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. For example, the first network node 602 may determine (e.g., at 608) a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. In some aspects, 904 may be performed by the CSI component 198.

At 906, the first network node may perform one or more processes based on the CSI-RS transmission associated with the set of CSI-RS EPREs in the first carrier, where the one or more processes include time or frequency tracking based on the CSI-RS transmission or generation of measurement information based on the CSI-RS transmission. For example, the first network node 602 may perform one or more processes (e.g., at 610) based on the CSI-RS transmission associated with the set of CSI-RS EPREs in the first carrier, where the one or more processes include time or frequency tracking based on the CSI-RS transmission or generation of measurement information based on the CSI-RS transmission. In some aspects, 906 may be performed by the CSI component 198. As an example, time or frequency tracking may refer to time tracking, frequency tracking, or time and frequency tracking.

Figure 10:
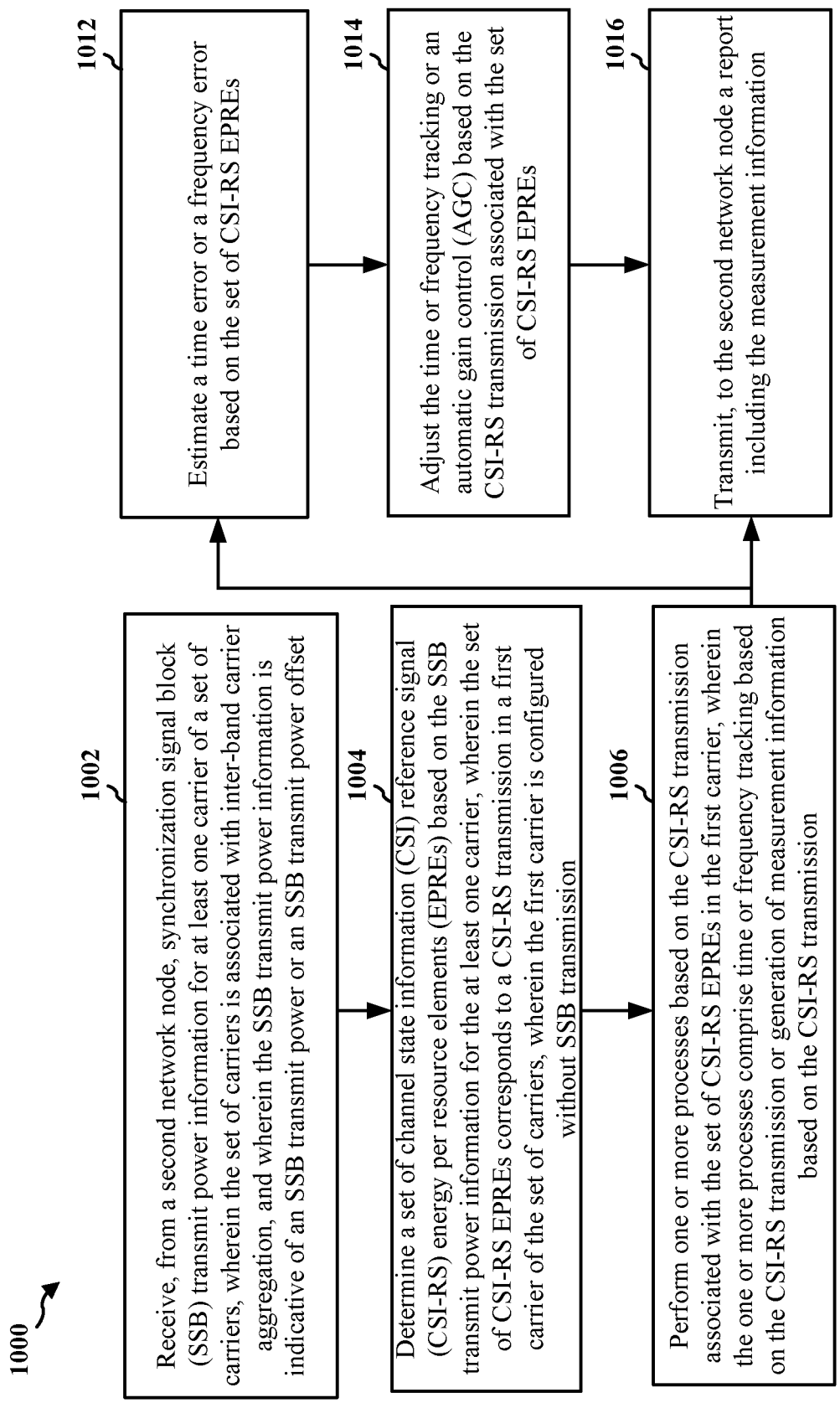
FIG. 10 is a flowchart of a method of wireless communication.

FIG. 10 is a flowchart 1000 of a method of wireless communication at a first network node. The first network node may be a UE (e.g., the UE 104, the network node 602, the apparatus 1204).

At 1002, the first network node may receive, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. For example, the first network node 602 may receive, from a second network node 604, synchronization signal block (SSB) transmit power information (e.g., 606) for at least one carrier of a set of carriers, where the set of carriers is associated with inter-band carrier aggregation, and where the SSB transmit power information is indicative of an SSB transmit power or an SSB transmit power offset. In some aspects, 1002 may be performed by the CSI component 198. The second network node may be a base station or one or more components of a base station. In some aspects, each carrier of the at least one carrier is configured to include a respective SSB transmission associated with the SSB transmit power. In some aspects, each respective SSB transmission included in each carrier of the at least one carrier may be quasi-co-located with the CSI-RS transmission with respect to one or more of: a Doppler shift parameter, a Doppler spread parameter, an average delay parameter, a delay spread parameter, or a spatial domain parameter. In some aspects, the at least one carrier may include the first carrier, and where the first carrier may be associated with a virtual SSB associated with the SSB transmit power information. In some aspects, the at least one carrier may include a plurality of carriers configured without SSB transmission, where the plurality of carriers may include the first carrier, where each carrier of the plurality of carriers may be associated with the virtual SSB associated with the SSB transmit power information or a different virtual SSB associated with a different SSB transmit power information, and where each carrier of the plurality of carriers may be associated with a carrier with an SSB transmission. In some aspects, if the SSB transmit power is not explicitly included in the SSB transmit power information and if the SSB transmit power offset is not explicitly included in the SSB transmit power information, an SSB transmit power associated with the virtual SSB is equivalent to a second SSB transmit power associated with a carrier with an SSB transmission, an SSB transmit power associated with the virtual SSB may be equivalent to a second SSB transmit power associated with a carrier with an SSB transmission. In some aspects, the SSB transmit power information may be indicative of the SSB transmit power offset, and where the SSB transmit power offset may be relative to a second SSB transmit power for a carrier with an SSB transmission. In some aspects, the at least one carrier may include the first carrier without including additional carriers without SSB transmission, and where the SSB transmit power offset may be associated with the carrier without SSB transmission without being associated with the additional carriers without SSB transmission. In some aspects, the at least one carrier may include a plurality of carriers without SSB transmission including the first carrier, and where the SSB transmit power offset may be associated with the plurality of carriers with no SSB transmission. In some aspects, if the SSB transmit power is not explicitly included in the SSB transmit power information and if the SSB transmit power offset is not explicitly included in the SSB transmit power information, the SSB transmit power offset may be zero.

In some aspects, to receive the SSB transmit power information, the first network node may receive a serving cell configuration, where the serving cell configuration may include the SSB transmit power information.

At 1004, the first network node may determine a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. For example, the first network node 602 may determine (e.g., at 608) a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. In some aspects, 1004 may be performed by the CSI component 198.

At 1006, the first network node may perform one or more processes based on the CSI-RS transmission associated with the set of CSI-RS EPREs in the first carrier, where the one or more processes include time or frequency tracking based on the CSI-RS transmission or generation of measurement information based on the CSI-RS transmission. For example, the first network node 602 may perform one or more processes (e.g., at 610) based on the CSI-RS transmission associated with the set of CSI-RS EPREs in the first carrier, where the one or more processes include time or frequency tracking based on the CSI-RS transmission or generation of measurement information based on the CSI-RS transmission. In some aspects, 1006 may be performed by the CSI component 198. In some aspects, the measurement information may include information associated with at least one of beam management measurement, CSI measurement or radio resource measurement (RRM) measurement. In some aspects, the time or frequency tracking may be based on a tracking reference signal (TRS) corresponding to the CSI-RS transmission.

In some aspects, at 1012, to perform the time or frequency tracking, the first network node may estimate a time error or a frequency error based on the set of CSI-RS EPREs. In some aspects, 1012 may be performed by the CSI component 198. In some aspects, at 1014, the first network node may adjust the time or frequency tracking or an automatic gain control (AGC) based on the CSI-RS transmission associated with the set of CSI-RS EPREs. In some aspects, 1014 may be performed by the CSI component 198. In some aspects, at 1016, the first network node may transmit, to the second network node a report including the measurement information. For example, the first network node 602 transmit, to the second network node 604, a report 612 including the measurement information. In some aspects, 1016 may be performed by the CSI component 198.

Figure 11:
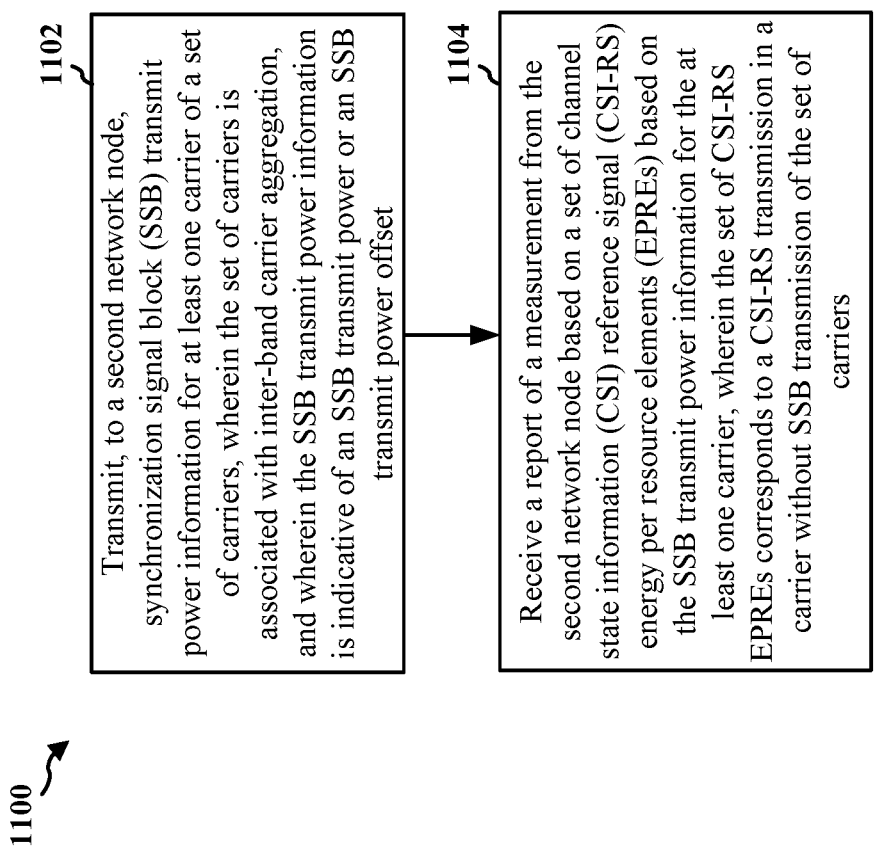
FIG. 11 is a flowchart of a method of wireless communication.

FIG. 11 is a flowchart 1100 of a method of wireless communication at a first network node. The first network node may be a network entity (e.g., such as the base station 102 or one or more components of the base station 102, the network node 604, the network entity 1202, the network entity 1302, the network entity 1460).

At 1102, the network node may transmit, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. For example, the network node 604 may transmit, to a second network node 602, synchronization signal block (SSB) transmit power information (e.g., 606) for at least one carrier of a set of carriers, where the set of carriers is associated with inter-band carrier aggregation, and where the SSB transmit power information is indicative of an SSB transmit power or an SSB transmit power offset. In some aspects, 1102 may be performed by CSI component 199.

At 1104, the network node may receive a report of a measurement from the second network node based on a set of CSI-RS EPREs based on the SSB transmit power information for the at least one carrier, where the set of CSI-RS EPREs corresponds to a CSI-RS transmission in a carrier without SSB transmission of the set of carriers. For example, the network node 604 may receive a report 612 of a measurement from the second network node based on a set of CSI-RS EPREs based on the SSB transmit power information for the at least one carrier, where the set of CSI-RS EPREs corresponds to a CSI-RS transmission in a carrier without SSB transmission of the set of carriers. In some aspects, 1104 may be performed by CSI component 199.

Figure 12:
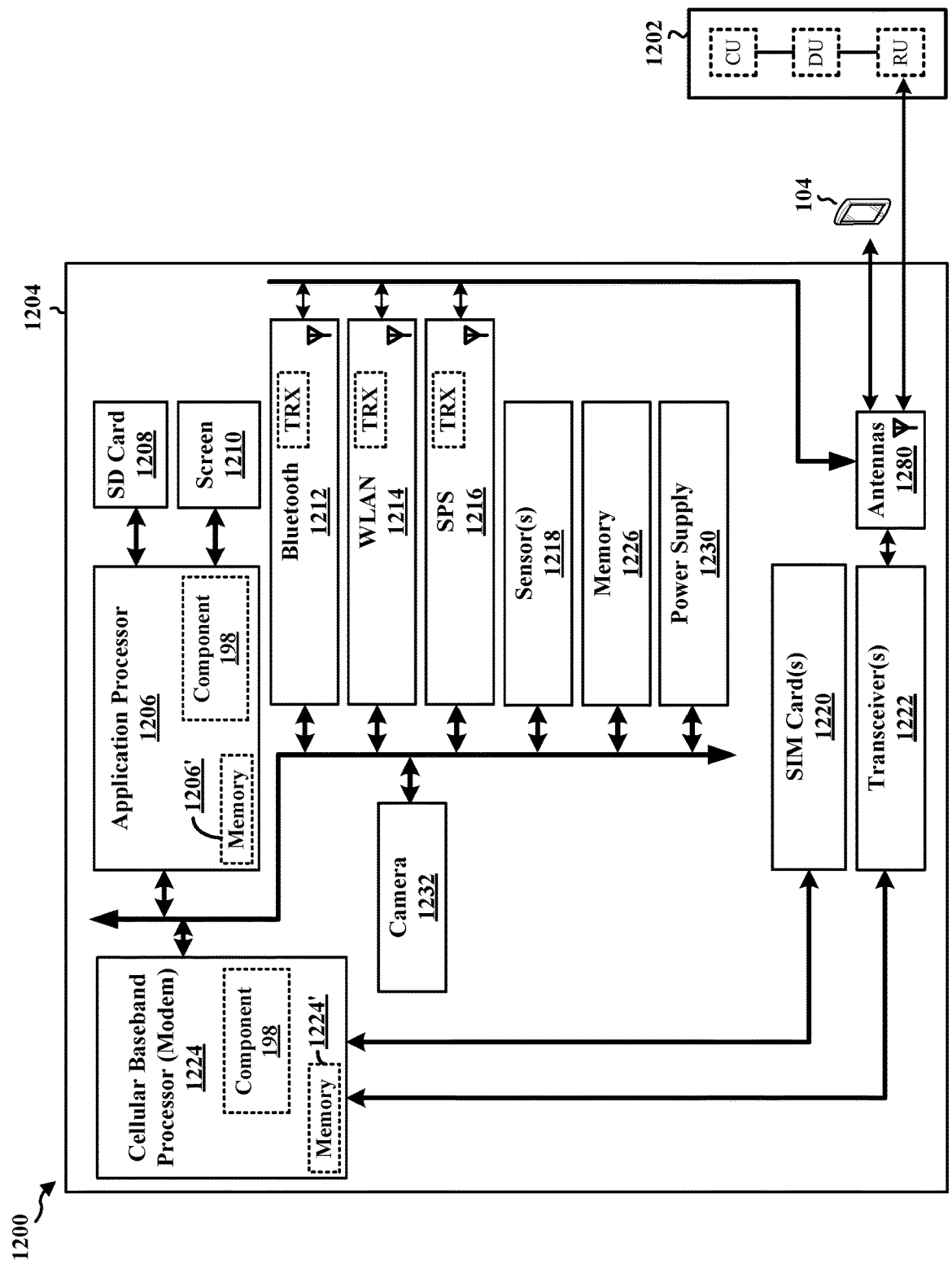
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, a satellite system module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the satellite system module 1216 may include an on-chip transceiver (TRX)/receiver (RX). The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described herein. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed herein, the CSI component 198 may be configured to receive, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. In some aspects, the CSI component 198 may be further configured to determine a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. In some aspects, the CSI component 198 may be further configured to perform one or more processes based on the CSI-RS transmission associated with the set of CSI-RS EPREs in the first carrier, where the one or more processes include time or frequency tracking based on the CSI-RS transmission or generation of measurement information based on the CSI-RS transmission. The CSI component 198 may be within the cellular baseband processor 1224, the application processor 1206, or both the cellular baseband processor 1224 and the application processor 1206. The CSI component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. In some aspects, the apparatus 1204 may further include means for determining a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission. In some aspects, the apparatus 1204 may further include means for performing one or more processes based on the CSI-RS transmission associated with the set of CSI-RS EPREs in the first carrier, the one or more processes including generating measurement information or performing time or frequency tracking. In some aspects, the apparatus 1204 may further include means for estimating a time error or a frequency error based on the set of CSI-RS EPREs. In some aspects, the apparatus 1204 may further include means for adjusting a time or frequency tracking or an automatic gain control (AGC) based on the CSI-RS transmission associated with the set of CSI-RS EPREs. In some aspects, the apparatus 1204 may further include means for transmitting, to the second network node a report including the measurement information. The means may be the CSI component 198 of the apparatus 1204 configured to perform the functions recited by the means. As described herein, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
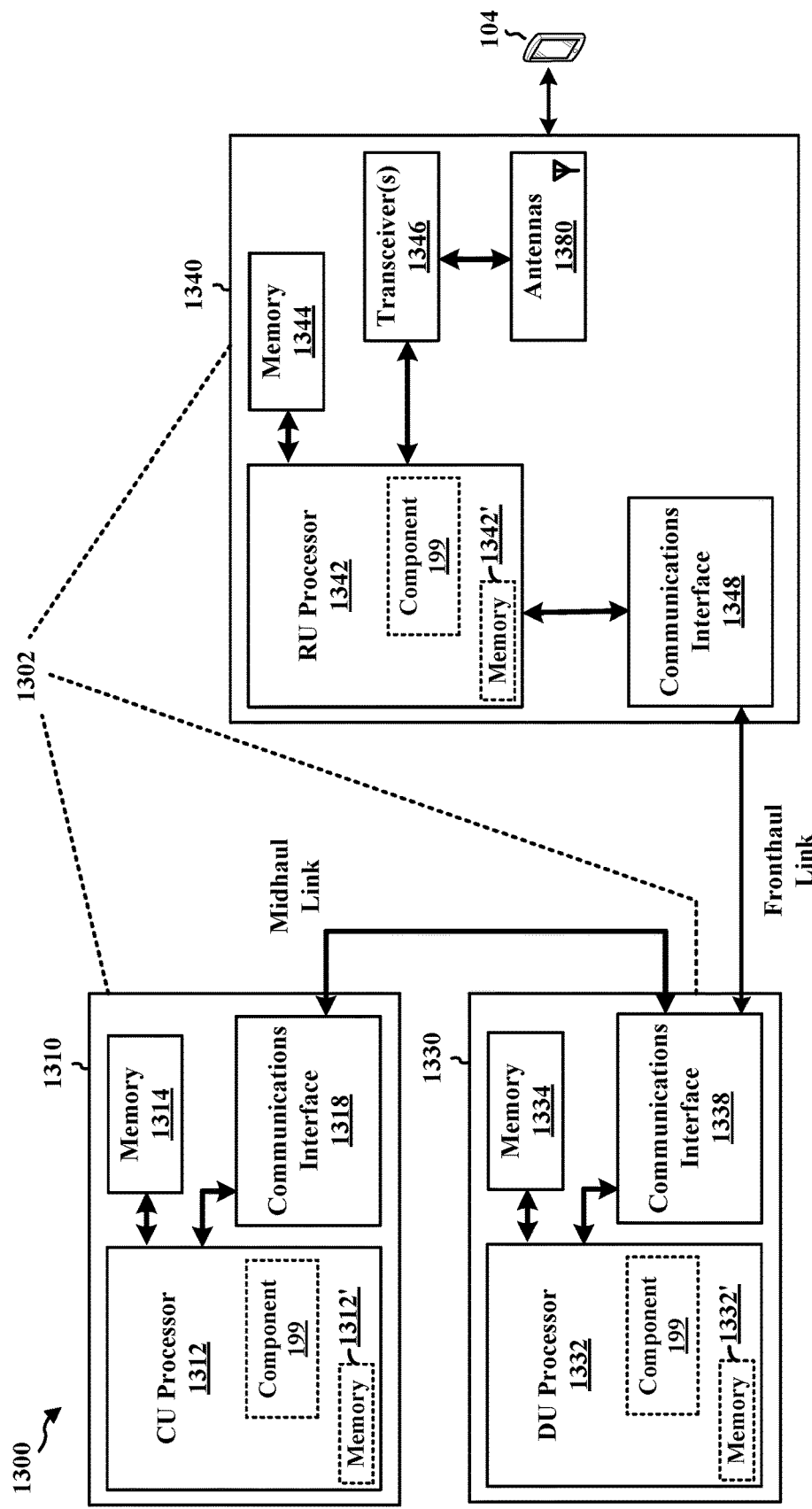
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the CSI component 199 may be configured to transmit, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. In some aspects, the CSI component 199 may be further configured to receive a report of a measurement from the second network node based on a set of CSI-RS EPREs based on the SSB transmit power information for the at least one carrier, where the set of CSI-RS EPREs corresponds to a CSI-RS transmission in a carrier without SSB transmission of the set of carriers. The CSI component 199 may be within one or more processors of one or more of the CU 1310, DU 1330, and the RU 1340. The CSI component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. In some aspects, the network entity 1302 may further include means for receiving a report of a measurement from the second network node based on a set of CSI-RS EPREs based on the SSB transmit power for the at least one carrier, where the set of CSI-RS EPREs corresponds to a CSI-RS transmission in a carrier with no SSB transmission of the set of carriers. The means may be the CSI component 199 of the network entity 1302 configured to perform the functions recited by the means. As described herein, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
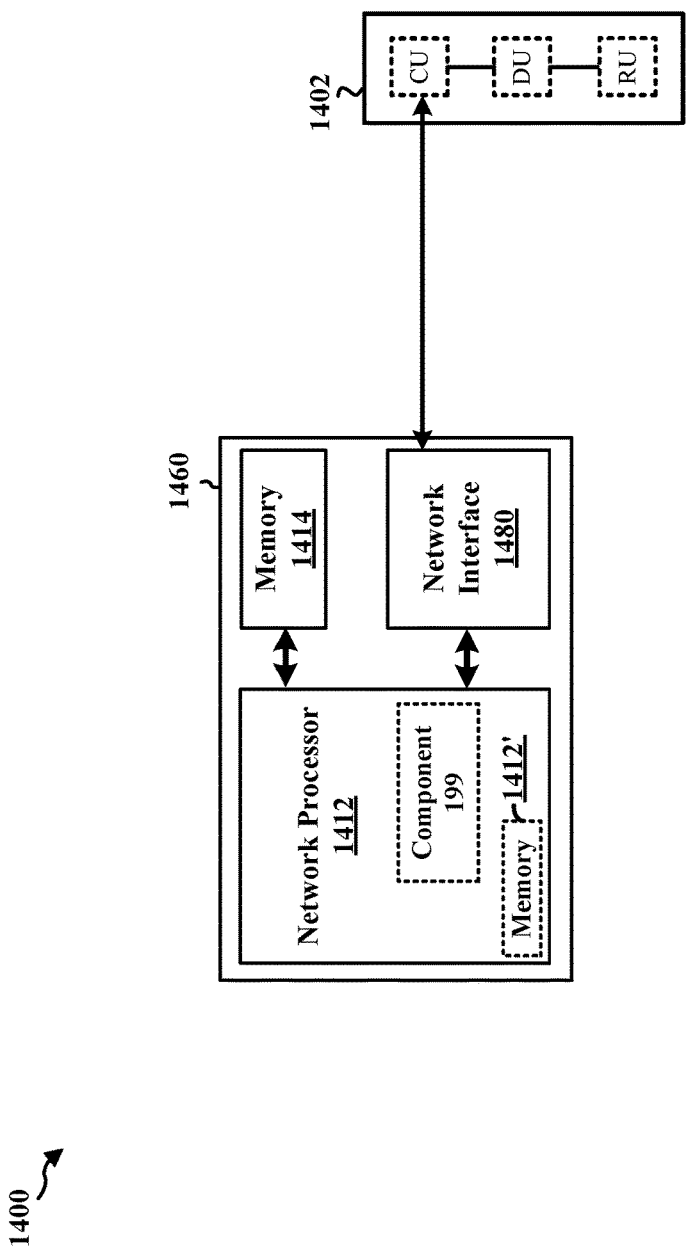
FIG. 14 is a diagram illustrating an example of a hardware implementation for a network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the CSI component 199 may be configured to transmit, to a second network node, SSB transmit power information for at least one carrier of a set of carriers, wherein the set of carriers is associated with inter-band carrier aggregation, and wherein the SSB transmit power information is indicative of an SSB transmit power or an SSB transmit power offset. In some aspects, the CSI component 199 may be further configured to receive a report of a measurement from the second network node based on a set of CSI-RS EPREs based on the SSB transmit power for the at least one carrier, where the set of CSI-RS EPREs corresponds to a CSI-RS transmission in a carrier with no SSB transmission of the set of carriers. The component 199 may be within the processor 1412. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for transmitting, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset. The means may be the component 199 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network node, comprising: receiving, from a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset; determining a set of channel state information (CSI) reference signal (CSI-RS) energy per resource elements (EPREs) based on the SSB transmit power information for the at least one carrier, where the set of CSI-RS EPREs corresponds to a CSI-RS transmission in a first carrier of the set of carriers, where the first carrier is configured without SSB transmission; and performing one or more processes based on the CSI-RS transmission associated with the set of CSI-RS EPREs in the first carrier, where the one or more processes comprise time or frequency tracking based on the CSI-RS transmission or generation of measurement information based on the CSI-RS transmission.

Aspect 2 is the method of aspect 1, where each carrier of the at least one carrier is configured to include a respective SSB transmission associated with the SSB transmit power.

Aspect 3 is the method of any of aspects 1-2, where each respective SSB transmission included in each carrier of the at least one carrier is quasi-co-located with the CSI-RS transmission with respect to one or more of: a Doppler shift parameter, a Doppler spread parameter, an average delay parameter, a delay spread parameter, or a spatial domain parameter.

Aspect 4 is the method of any of aspects 1-3, where the at least one carrier includes the first carrier, and where the first carrier is associated with a virtual SSB associated with the SSB transmit power information.

Aspect 5 is the method of any of aspects 1-4, where the at least one carrier comprises a plurality of carriers configured without SSB transmission, where the plurality of carriers includes the first carrier, where each carrier of the plurality of carriers is associated with the virtual SSB associated with the SSB transmit power information or a different virtual SSB associated with a different SSB transmit power information, and where each carrier of the plurality of carriers is associated with a carrier with an SSB transmission.

Aspect 6 is the method of any of aspects 1-5, where if the SSB transmit power is not explicitly included in the SSB transmit power information and if the SSB transmit power offset is not explicitly included in the SSB transmit power information, an SSB transmit power associated with the virtual SSB is equivalent to a second SSB transmit power associated with a carrier with an SSB transmission.

Aspect 7 is the method of any of aspects 1-6, where the SSB transmit power information is indicative of the SSB transmit power offset, and where the SSB transmit power offset is relative to a second SSB transmit power for a carrier with an SSB transmission.

Aspect 8 is the method of any of aspects 1-7, where the at least one carrier includes the first carrier without including additional carriers without SSB transmission, and where the SSB transmit power offset is associated with the carrier without SSB transmission without being associated with the additional carriers without SSB transmission.

Aspect 9 is the method of any of aspects 1-8, where the at least one carrier comprises a plurality of carriers without SSB transmission including the first carrier, and where the SSB transmit power offset is associated with the plurality of carriers with no SSB transmission.

Aspect 10 is the method of any of aspects 1-9, where if the SSB transmit power is not explicitly included in the SSB transmit power information and if the SSB transmit power offset is not explicitly included in the SSB transmit power information, the SSB transmit power offset is zero.

Aspect 11 is the method of any of aspects 1-10, where receiving the SSB transmit power information further includes receiving a serving cell configuration, where the serving cell configuration includes the SSB transmit power information.

Aspect 12 is the method of any of aspects 1-11, where the measurement information includes information associated with at least one of beam management measurement, CSI measurement, or radio resource measurement (RRM) measurement.

Aspect 13 is the method of any of aspects 1-12, where the time or frequency tracking is based on a tracking reference signal (TRS) corresponding to the CSI-RS transmission.

Aspect 14 is the method of any of aspects 1-13, performing the time or frequency tracking based on the CSI-RS transmission, further includes estimating a time error or a frequency error based on the set of CSI-RS EPREs.

Aspect 15 is the method of any of aspects 1-14, further including: adjusting the time or frequency tracking or an automatic gain control (AGC) based on the CSI-RS transmission associated with the set of CSI-RS EPREs.

Aspect 16 is the method of any of aspects 1-15, further including: transmitting, to the second network node a report including the measurement information.

Aspect 17 is the method of any of aspects 1-16, where the first network node corresponds to a user equipment (UE) or at least one component of the UE, and the second network node corresponds to a base station or one or more components of the base station.

Aspect 18 is a method wireless communication at a first network node, comprising: transmitting, to a second network node, synchronization signal block (SSB) transmit power information for at least one carrier of a set of carriers, where the set of carriers is associated with inter-band carrier aggregation, and where the SSB transmit power information is indicative of an SSB transmit power or an SSB transmit power offset; and receiving a report of a measurement from the second network node based on a set of channel state information (CSI) reference signal (CSI-RS) energy per resource elements (EPREs) based on the SSB transmit power information for the at least one carrier, where the set of CSI-RS EPREs corresponds to a CSI-RS transmission in a carrier without SSB transmission of the set of carriers.

Aspect 19 is the method of aspect 18, where each carrier of the at least one carrier is configured to include a respective SSB transmission associated with the SSB transmit power.

Aspect 20 is the method of any of aspects 18-19, where each respective SSB transmission included in each carrier of the at least one carrier is quasi-co-located with the CSI-RS transmission with respect to one or more of: a Doppler shift parameter, a Doppler spread parameter, an average delay parameter, a delay spread parameter, or a spatial domain parameter.

Aspect 21 is the method of any of aspects 18-20, where the at least one carrier includes the first carrier, and where the first carrier is associated with a virtual SSB associated with the SSB transmit power information.

Aspect 22 is the method of any of aspects 18-21, where the at least one carrier comprises a plurality of carriers configured without SSB transmission, where the plurality of carriers includes the first carrier, where each carrier of the plurality of carriers is associated with the virtual SSB associated with the SSB transmit power information or a different virtual SSB associated with a different SSB transmit power information, and where each carrier of the plurality of carriers is associated with a carrier with an SSB transmission.

Aspect 23 is the method of any of aspects 18-22, where if the SSB transmit power is not explicitly included in the SSB transmit power information and if the SSB transmit power offset is not explicitly included in the SSB transmit power information, an SSB transmit power associated with the virtual SSB is equivalent to a second SSB transmit power associated with a carrier with an SSB transmission.

Aspect 24 is the method of any of aspects 18-23, where the SSB transmit power information is indicative of the SSB transmit power offset, and where the SSB transmit power offset is relative to a second SSB transmit power for a carrier with an SSB transmission.

Aspect 25 is the method of any of aspects 18-24, where the at least one carrier includes the first carrier without including additional carriers without SSB transmission, and where the SSB transmit power offset is associated with the carrier without SSB transmission without being associated with the additional carriers without SSB transmission.

Aspect 26 is the method of any of aspects 18-25, where the at least one carrier comprises a plurality of carriers without SSB transmission including the first carrier, and where the SSB transmit power offset is associated with the plurality of carriers with no SSB transmission.

Aspect 27 is the method of any of aspects 18-26, where if the SSB transmit power is not explicitly included in the SSB transmit power information and if the SSB transmit power offset is not explicitly included in the SSB transmit power information, the SSB transmit power offset is zero.

Aspect 28 is the method of any of aspects 18-27, where the second network node corresponds to a user equipment (UE) or at least one component of the UE, and the first network node corresponds to a base station or one or more components of the base station.

Aspect 29 is an apparatus for wireless communication at a first network node including a memory and at least one processor coupled to the memory and, based on information stored in the memory, configured to perform a method in accordance with any of aspects 1-17. The apparatus may include at least one of a transceiver or an antenna coupled to the at least one processor.

Aspect 30 is an apparatus for wireless communications at a first network node, including means for performing a method in accordance with any of aspects 1-17.

Aspect 31 is a non-transitory computer-readable medium including instructions that, when executed by an apparatus, cause the apparatus to perform a method in accordance with any of aspects 1-17.

Aspect 32 is an apparatus for wireless communication at a first network node including a memory and at least one processor coupled to the memory and, based on information stored in the memory, configured to perform a method in accordance with any of aspects 18-28. The apparatus may include at least one of a transceiver or an antenna coupled to the at least one processor.

Aspect 33 is an apparatus for wireless communications at a first network node, including means for performing a method in accordance with any of aspects 18-28.

Aspect 34 is a non-transitory computer-readable medium including instructions that, when executed by an apparatus, cause the apparatus to perform a method in accordance with any of aspects 18-28.

What is claimed is:

1. A first network node for wireless communication, comprising:
   a memory; and
   at least one processor coupled to the memory, wherein the at least one processor is configured to:
     receive, from a second network node, synchronization signal block (SSB) transmit power information for at least one carrier of a set of carriers associated with inter-band carrier aggregation, wherein the at least one carrier includes an anchor carrier configured with an SSB transmission, and wherein the SSB transmit power information is indicative of an SSB transmit power or an SSB transmit power offset of the anchor carrier configured with the SSB transmission;
     determine, based on the SSB transmit power or the SSB transmit power offset of the anchor carrier, a set of channel state information (CSI) reference signal (CSI-RS) energy per resource elements (EPREs) corresponding to a CSI-RS transmission in a first carrier of the set of carriers, wherein the first carrier is an SSB-less carrier configured without SSB transmission and associated with the anchor carrier; and
     perform one or more processes based on the CSI-RS transmission associated with the set of CSI-RS EPREs in the first carrier, wherein the one or more processes comprise time or frequency tracking based on the CSI-RS transmission or generation of measurement information based on the CSI-RS transmission.

2. The first network node of claim 1, wherein each carrier of the at least one carrier is configured to include a respective SSB transmission associated with the SSB transmit power.

3. The first network node of claim 2, wherein each respective SSB transmission included in each carrier of the at least one carrier is quasi-co-located with the CSI-RS transmission with respect to one or more of: a Doppler shift parameter, a Doppler spread parameter, an average delay parameter, a delay spread parameter, or a spatial domain parameter.

4. The first network node of claim 1, wherein the at least one carrier includes the first carrier, and wherein the first carrier is associated with a virtual SSB associated with the SSB transmit power information.

5. The first network node of claim 4, wherein the at least one carrier comprises a plurality of carriers configured without SSB transmission, wherein the plurality of carriers includes the first carrier, wherein each carrier of the plurality of carriers is associated with the virtual SSB associated with the SSB transmit power information or a different virtual SSB associated with a different SSB transmit power information, and wherein each carrier of the plurality of carriers is associated with a carrier with an SSB transmission.

6. The first network node of claim 4, wherein if the SSB transmit power is not explicitly included in the SSB transmit power information and if the SSB transmit power offset is not explicitly included in the SSB transmit power information, an SSB transmit power associated with the virtual SSB is equivalent to a second SSB transmit power associated with a carrier with an SSB transmission.

7. The first network node of claim 1, wherein the SSB transmit power information is indicative of the SSB transmit power offset, and wherein the SSB transmit power offset is relative to a second SSB transmit power for a carrier with an SSB transmission.

8. The first network node of claim 7, wherein the at least one carrier includes the first carrier without including additional carriers without SSB transmission, and wherein the SSB transmit power offset is associated with the carrier without SSB transmission without being associated with the additional carriers without SSB transmission.

9. The first network node of claim 7, wherein the at least one carrier comprises a plurality of carriers without SSB transmission including the first carrier, and wherein the SSB transmit power offset is associated with the plurality of carriers with no SSB transmission.

10. The first network node of claim 7, wherein if the SSB transmit power is not explicitly included in the SSB transmit power information and if the SSB transmit power offset is not explicitly included in the SSB transmit power information, the SSB transmit power offset is zero.

11. The first network node of claim 1, wherein, to receive the SSB transmit power information, the at least one processor is configured to receive a serving cell configuration, wherein the serving cell configuration includes SSB transmit power information.

12. The first network node of claim 1, wherein the measurement information includes information associated with at least one of beam management measurement, CSI measurement, or radio resource measurement (RRM) measurement.

13. The first network node of claim 1, wherein the time or frequency tracking is based on a tracking reference signal (TRS) corresponding to the CSI-RS transmission.

14. The first network node of claim 1, wherein, to perform the time or frequency tracking based on the CSI-RS transmission, the at least one processor is configured to:
estimate a time error or a frequency error based on the set of CSI-RS EPRES.

15. The first network node of claim 1, wherein the at least one processor is further configured to:
adjust the time or frequency tracking or an automatic gain control (AGC) based on the CSI-RS transmission associated with the set of CSI-RS EPRES.

16. The first network node of claim 1, wherein the at least one processor is further configured to:
transmit, to the second network node a report including the measurement information.

17. The first network node of claim 1, wherein the first network node corresponds to a user equipment (UE) or at least one component of the UE, and the second network node corresponds to a base station or one or more components of the base station.

18. A first network node for wireless communication, comprising:
memory; and
at least one processor coupled to the memory, wherein the at least one processor is configured to:
transmit, to a second network node, synchronization signal block (SSB) transmit power information for at least one carrier of a set of carriers associated with inter-band carrier aggregation, wherein the at least one carrier includes an anchor carrier configured with an SSB transmission, and wherein the SSB transmit power information is indicative of an SSB transmit power or an SSB transmit power offset of the anchor carrier configured with the SSB transmission; and
receive a report of a measurement from the second network node based on a set of channel state information (CSI) reference signal (CSI-RS) energy per resource elements (EPREs) based on the SSB transmit power information for the at least one carrier, wherein the set of CSI-RS EPREs corresponds to a CSI-RS transmission in an SSB-less carrier without SSB transmission, and wherein the SSB-less carrier is included in the set of carriers and is associated with the anchor carrier.

19. The first network node of claim 18, wherein each carrier of the at least one carrier is configured to include a respective SSB transmission associated with the SSB transmit power.

20. The first network node of claim 19, wherein each respective SSB transmission included in each carrier of the at least one carrier is quasi-co-located with the CSI-RS transmission with respect to one or more of: a Doppler shift parameter, a Doppler spread parameter, an average delay parameter, a delay spread parameter, or a spatial domain parameter.

21. The first network node of claim 18, wherein the at least one carrier includes the first carrier, and wherein the first carrier is associated with a virtual SSB associated with the SSB transmit power information.

22. The first network node of claim 21, wherein the at least one carrier comprises a plurality of carriers configured without SSB transmission, wherein the plurality of carriers includes the first carrier, wherein each carrier of the plurality of carriers is associated with the virtual SSB associated with the SSB transmit power information or a different virtual SSB associated with a different SSB transmit power information, and wherein each carrier of the plurality of carriers is associated with a carrier with an SSB transmission.

23. The first network node of claim 21, wherein if the SSB transmit power is not explicitly included in the SSB transmit power information and if the SSB transmit power offset is not explicitly included in the SSB transmit power information, an SSB transmit power associated with the virtual SSB is equivalent to a second SSB transmit power associated with a carrier with an SSB transmission.

24. The first network node of claim 18, wherein the SSB transmit power information is indicative of the SSB transmit power offset, and wherein the SSB transmit power offset is relative to a second SSB transmit power for a carrier with an SSB transmission.

25. The first network node of claim 24, wherein the at least one carrier includes the first carrier without including additional carriers without SSB transmission, and wherein the SSB transmit power offset is associated with the carrier without SSB transmission without being associated with the additional carriers without SSB transmission.

26. The first network node of claim 24, wherein the at least one carrier comprises a plurality of carriers without SSB transmission including the first carrier, and wherein the SSB transmit power offset is associated with the plurality of carriers with no SSB transmission.

27. The first network node of claim 24, wherein if the SSB transmit power is not explicitly included in the SSB transmit power information and if the SSB transmit power offset is not explicitly included in the SSB transmit power information, the SSB transmit power offset is zero.

28. The first network node of claim 18, wherein the second network node corresponds to a user equipment (UE) or at least one component of the UE, and the first network node corresponds to a base station or one or more components of the base station.

29. A method for wireless communication at a first network node, comprising:
receiving, from a second network node, synchronization signal block (SSB) transmit power information for at least one carrier of a set of carriers associated with inter-band carrier aggregation, wherein the at least one carrier includes an anchor carrier configured with an SSB transmission, and wherein the SSB transmit power information is indicative of an SSB transmit power or an SSB transmit power offset of the anchor carrier configured with the SSB transmission;
determining, based on the SSB transmit power or the SSB transmit power offset of the anchor carrier, a set of channel state information (CSI) reference signal (CSI-RS) energy per resource elements (EPREs) corresponding to a CSI-RS transmission in a first carrier of the set of carriers, wherein the first carrier is an SSB-less carrier configured without SSB transmission and associated with the anchor carrier; and
performing one or more processes based on the CSI-RS transmission associated with the set of CSI-RS EPREs in the first carrier, wherein the one or more processes comprise time or frequency tracking based on the CSI-RS transmission or generation of measurement information based on the CSI-RS transmission.

30. A method for wireless communication at a first network node, comprising:
transmitting, to a second network node, synchronization signal block (SSB) transmit power information for at least one carrier of a set of carriers associated with inter-band carrier aggregation, where the at least one carrier includes an anchor carrier configured with an SSB transmission, and where the SSB transmit power information is indicative of an SSB transmit power or an SSB transmit power offset of the anchor carrier configured with the SSB transmission; and
receiving a report of a measurement from the second network node based on a set of channel state information (CSI) reference signal (CSI-RS) energy per resource elements (EPREs) based on the SSB transmit power information for the at least one carrier, wherein the set of CSI-RS EPREs corresponds to a CSI-RS transmission in an SSB-less carrier without SSB transmission, and wherein the SSB-less carrier is included in the set of carriers and is associated with the anchor carrier.

* * * * *